United States Patent
Yao et al.

(10) Patent No.: US 11,876,586 B2
(45) Date of Patent: Jan. 16, 2024

(54) POWER CONTROL IMPLEMENTATION METHOD AND APPARATUS, COMMUNICATION NODE, AND COMPUTER-READABLE STORAGE MEDIUM

(71) Applicant: ZTE CORPORATION, Shenzhen (CN)

(72) Inventors: Ke Yao, Shenzhen (CN); Yu Ngok Li, Hong Kong (CN); Hao Wu, Shenzhen (CN); Bo Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/422,138

(22) PCT Filed: Jan. 10, 2020

(86) PCT No.: PCT/CN2020/071304
§ 371 (c)(1),
(2) Date: Jul. 9, 2021

(87) PCT Pub. No.: WO2020/143733
PCT Pub. Date: Jul. 16, 2020

(65) Prior Publication Data
US 2022/0094404 A1    Mar. 24, 2022

(30) Foreign Application Priority Data
Jan. 11, 2019 (CN) .......................... 201910028585.0

(51) Int. Cl.
*H04B 7/04* (2017.01)
*H04B 7/0456* (2017.01)
*H04W 52/42* (2009.01)

(52) U.S. Cl.
CPC .......... *H04B 7/0473* (2013.01); *H04W 52/42* (2013.01)

(58) Field of Classification Search
CPC .............................. H04B 7/0473; H04W 52/42
See application file for complete search history.

(56) References Cited

U.S. PATENT DOCUMENTS

| | | | |
|---|---|---|---|
| 10,135,509 | B1 | 11/2018 | Marupaduga et al. |
| 2012/0320773 | A1 | 12/2012 | Toufik et al. |

(Continued)

FOREIGN PATENT DOCUMENTS

| | | |
|---|---|---|
| CN | 101990293 A | 3/2011 |
| CN | 102083223 A | 6/2011 |

(Continued)

OTHER PUBLICATIONS

International Search Report for Application No. PCT/CN2020/071304, dated Apr. 10, 2020, 6 pages including translation.

(Continued)

*Primary Examiner* — Curtis B Odom
(74) *Attorney, Agent, or Firm* — Morgan, Lewis & Bockius LLP

(57) ABSTRACT

Provided are a power control implementation method and apparatus, a communication node, and a computer-readable storage medium. The method includes: acquiring information about TPMI, determining one or more precoding codewords in a preconfigured precoding codeword set according to the information about TPMI, and performing transmission to a second communication node according to the one or more precoding codewords.

18 Claims, 2 Drawing Sheets

(56) References Cited

U.S. PATENT DOCUMENTS

| | | | | |
|---|---|---|---|---|
| 2021/0219129 | A1* | 7/2021 | Liu | H04W 52/365 |
| 2022/0007298 | A1* | 1/2022 | Huang | H04W 52/146 |
| 2022/0015039 | A1* | 1/2022 | Huang | H04W 52/04 |

FOREIGN PATENT DOCUMENTS

| | | | |
|---|---|---|---|
| CN | 102255643 | A | 11/2011 |
| CN | 102255705 | A | 11/2011 |
| CN | 102394677 | A | 3/2012 |
| CN | 102422582 | A | 4/2012 |
| CN | 109167621 | A | 1/2019 |
| CN | 110535499 | A | 12/2019 |

OTHER PUBLICATIONS

Qualcomm Incorporated, "Full Tx power for UL transmissions", *3GPP TSG RAN WG1 Meeting #94bis R1-1811279* https://www.3gpp.org/ftp/tsg_ran/WG1 RL1/TSGR1 94b/Docs, Sep. 29, 2018 (Sep. 29, 2018), sections 2 and 3.

Samsung, "Issues on codebook based UL transmission", *3GPP TSG RAN WG1 Meeting #93 R1-1806709* https://www.3gpp.org/ftp/tsg_ran/WG1 RL1/TSGR1 93/Docs, May 11, 2018 (May 11, 2018), section 2.

Chinese Office Action for Application No. 201910028585.0, dated May 5, 2022, 20 pages including translation.

Chinese Search Report for Application No. 201910028585.0, dated Apr. 24, 2022, 5 pages including translation.

Mediatek Inc., "Full Tx power UL transmission", *3GPP TSG RAN WG1 Meeting #94bis R1-1810436*, Chengdu, China, Oct. 8-12, 2018, 8 pages.

Mediatek Inc., "Full Tx power UL transmission", *3GPP TSG RAN WG1 Meeting #95 R1-1812351*, Spokane, USA, Nov. 12-16, 2018, 15 pages.

Extended European Search Report for Application No. 20738429.8, dated Aug. 19, 2022, 10 pages.

Canadian Office Action for Application No. 3126301, dated Sep. 28, 2022, 4 pages.

Qualcomm Incorporated, "Full Tx power for UL transmissions", 3GPP TSG RAN WG1 Meeting #95, R1-1813897, Spokane, WA, USA, Nov. 12-16, 2018, 10 pages.

Chinese Supplemental Search Report for Application No. 201910028585.0, dated Nov. 4, 2022, 4 pages including translation.

Chinese 2$^{nd}$ Office Action for Application No. 201910028585.0, dated Nov. 14, 2022, 18 pages including translation.

ZTE, "Full Tx power for UL transmission", 3GPP TSG RAN WG1 Meeting #95, R1-1812258, Spokane, WA, USA, Nov. 12-16, 2018, 4 pages.

CATT, "Consideration on full transmission power of UL", 3GPP TSG RAN WG1 Meeting #94bis, R1-1810557, Chengdu, China, Oct. 8-12, 2018, 7 pages.

\* cited by examiner

POWER CONTROL IMPLEMENTATION METHOD AND APPARATUS, COMMUNICATION NODE, AND COMPUTER-READABLE STORAGE MEDIUM

CROSS-REFERENCE TO RELATED APPLICATIONS

This is a National Stage Application, filed under 35 U.S.C. 371, of International Patent Application No. PCT/CN2020/071304, filed on Jan. 10, 2020, which is based on and claims priority to Chinese Patent Application No. 201910028585.0 filed with the CNIPA on Jan. 11, 2019, the disclosure of which is incorporated herein by reference in its entirety.

TECHNICAL FIELD

The embodiments of the present disclosure relate to a power control implementation method and apparatus, a communication node and a computer-readable storage medium.

BACKGROUND

In the conventional multi-antenna technology, due to the limit by device cost, the maximum sending power capacity of an equipment cannot be utilized when only a part of antennas are used for sending. For example, a user equipment (UE) that supports a maximum of two antennas can only use half the maximum sending power if only one antenna is used for sending. With the technology development, the device performance of a radio communication equipment is improving, and the cost is decreasing, so that a next-generation mobile communication system is likely to be equipped with multiple high-performance antennas, which also provides the possibility to optimize the maximum power limit.

Uplink multiple-input multiple-output (MIMO) transmission in a new radio (NR) system may be divided into two types: codebook based transmission and non codebook based transmission. For the non codebook based transmission, the use of the maximum power can be supported. For the codebook based transmission, there is no clear solution to support the use of the maximum power.

SUMMARY

Embodiments of the present disclosure provide a power control implementation method and apparatus, a communication node and a computer-readable storage medium.

An embodiment of the present disclosure provides a power control implementation method. The method is applied to a first communication node and includes the steps described below.

Information about transmit precoding matrix indicator (TPMI) is acquired.

One or more precoding codewords in a preconfigured precoding codeword set are determined according to the information about TPMI.

Transmission is performed to a second communication node according to the one or more precoding codewords.

An embodiment of the present disclosure further provides a power control implementation method. The method is applied to a second communication node and includes the steps described below.

One or more precoding codewords in a preconfigured precoding codeword set used by a first communication node are determined.

Corresponding information about TPMI is determined according to the one or more precoding codewords, and the information about TPMI is sent to the first communication node.

An embodiment of the present disclosure further provides a power control implementation apparatus. The apparatus includes an acquisition module, a first determination module and a first sending module.

The acquisition module is configured to acquire information about TPMI.

The first determination module is configured to determine one or more precoding codewords in a preconfigured precoding codeword set according to the information about TPMI.

The first sending module is configured to perform transmission to a second communication node according to the one or more precoding codewords.

An embodiment of the present disclosure further provides a power control implementation apparatus. The apparatus includes a second determination module and a second sending module.

The second determination module is configured to determine one or more precoding codewords in a preconfigured precoding codeword set used by a first communication node.

The second sending module is configured to determine corresponding information about TPMI according to the one or more precoding codewords, and send the information about TPMI to the first communication node.

An embodiment of the present disclosure further provides a communication node. The communication node includes a memory, a processor, and a computer program stored in the memory and executable by the processor. The processor, when executing the program, implements the power control implementation method.

An embodiment of the present disclosure further provides a computer-readable storage medium. The storage medium stores computer-executable instructions for executing the power control implementation method.

An embodiment of the present disclosure includes that: information about TPMI is acquired, one or more precoding codewords in a preconfigured precoding codeword set are determined according to the information about TPMI, and transmission is performed to a second communication node according to the one or more precoding codewords. According to the embodiment of the present disclosure, a communication node with non coherent capability/partial coherent capability may also perform full power sending, so that with the support of the capability of the communication node, better decoding performance and larger coverage can be achieved.

DETAILED DESCRIPTION

Figure 1:
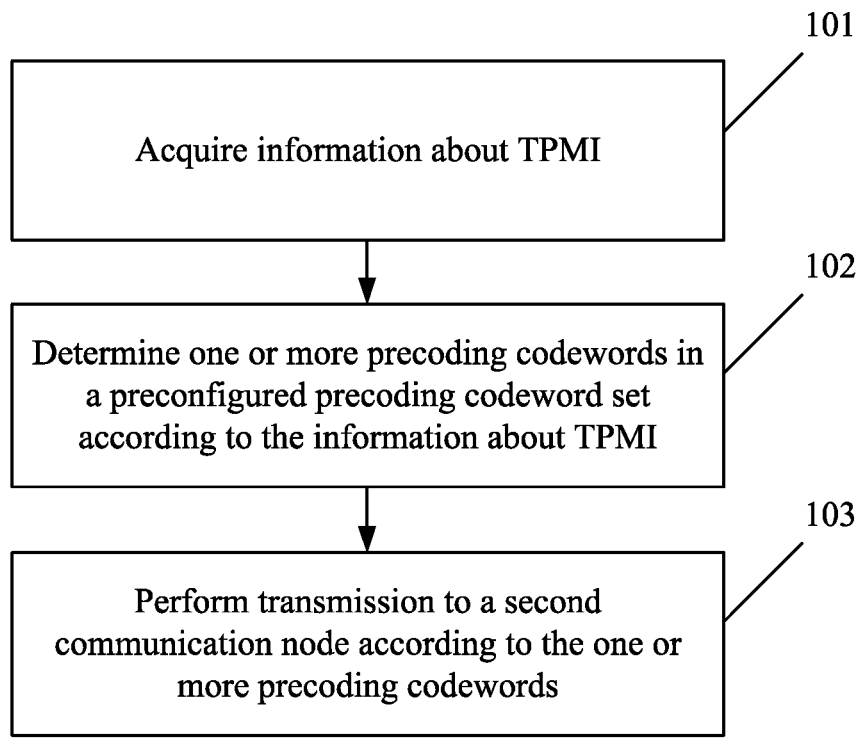
FIG. 1 is a flowchart of a power control implementation method according to an embodiment of the present disclosure (at a first communication node side).

Embodiments of the present application are described hereinafter in detail in conjunction with the drawings.

The steps illustrated in the flowcharts among the drawings may be executed by, for example, a computer system of a group of computer executable instructions. Moreover, although logical sequences are illustrated in the flowcharts, the steps illustrated or described may be executed in sequences different from those described herein in some cases.

No matter an equipment performs transmission by using a part or all of antennas or antenna ports, a limit to the maximum power is equivalent to the maximum power limit in the transmission using all antennas or antenna ports, which is referred to as full power (or full rate) sending.

For example, when a power level of a UE is equal to 3, the maximum power is generally configured to be 23 dBm. When the UE supports a maximum of 4 antenna ports, each antenna port may support maximum sending power of only 17 dBm, and 4 antenna ports may reach 23 dBm in total, that is, full power sending can be implemented. It is also possible that each of the 4 antenna ports can reach 23 dBm independently, and thus, one antenna port can also implement full power sending.

Uplink transmission of an NR system may be divided into two types: codebook based transmission and non codebook based transmission.

The codebook based transmission refers to that a base station selects a codeword from a predefined codebook and uses the codeword as precoding of the uplink transmission. The codebook includes multiple codewords, and each codeword is a matrix. Each row of the matrix represents a respective antenna port, and each column of the matrix represents a respective layer (MIMO layer). For example, Table 1 shows a codebook having 2 antenna ports and 1 layer. The codebook includes six codewords, and each codeword has two rows and one column. A codeword is identified by a TPMI. Generally, the base station determines the number of antenna ports according to the capability of a sending antenna of the UE, determines the number of layers for uplink transmission according to a channel measurement result, and specifies a determined precoding matrix for the uplink transmission. The UE precodes transmitted data by using the specified precoding matrix, and then send the precoded data to the base station. The non codebook based transmission refers to that the base station does not specify a codebook for the uplink transmission, and the codebook is determined by the UE.

When a UE is configured with multiple antennas, the capability of adjusting the phase difference between transmitted signals of antennas may be divided into different types: full coherent capability, partial coherent capability and non coherent capability. A UE with higher-level coherent capability supports lower-level coherent capability. The full coherent capability is higher than the partial coherent capability, and the partial coherent capability is higher than the non coherent capability.

An antenna port is an abstract representation of an antenna. Each antenna port may correspond to a respective antenna or multiple antennas. The standardization process focuses on only the antenna port. Unless otherwise noted, each antenna corresponds to a respective antenna port herein.

For example, a UE with full coherent capability may support partial coherent transmission and non coherent transmission. A UE with partial coherent capability also supports non coherent transmission. As shown in Table 1, the codebook having 2 antenna ports and 1 layer is illustrated, matrices of TPMI 0 and TPMI 1 each have a respective antenna port of 0. That is, the sending is performed by using only one antenna port, which is also referred to as antenna port selection, or antenna interface selection for short, or antenna selection. TPMI 0 and TPMI 1 are designed for a UE with non coherent capability. Matrices of TPMIs 2 to 5 each have no zero elements, which is for the case of using both antenna ports. The difference is that different TPMI matrices have different phase differences between antenna ports. Codewords of TPMIs 2 to 5 were originally designed for the UE with full coherent capability. In the case of 2 antenna ports, the antenna port capability is divided into only two types: full coherent capability and non coherent capability. Table 2 shows a codebook having 4 antenna ports and 1 layer. In the case of 4 antenna ports, the antenna port capability may be not only full coherent capability, non coherent capability, but also partial coherent capability. A codeword whose matrix has only one non-zero element among 4 elements in the matrix is used for non coherent transmission. A codeword whose matrix has two non-zero elements among 4 elements in the matrix is used for partial coherent transmission. A codeword whose matrix has four non-zero elements among 4 elements in the matrix is used for full coherent transmission. Codewords shown in Table 2 are used for the case of 4 antenna ports. The 4 antenna ports are denoted as antenna ports 0 to 3. For a codeword for partial coherent transmission in Table 2, assuming that antenna ports 0 and 2 are in a group, and antenna ports 1 and 3 are in another group. There is coherent capability between antenna ports within a group, that is, the phase difference may be controlled between antenna ports within a group, but there is no coherent capability between groups.

TABLE 1

| TPMI Index | W (TPMI indexes from left to right corresponds to values from small to large) | | | | | | |
|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

TABLE 2

| TPMI Index | W (TPMI indexes from left to right correspond to values from small to large) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

For the non codebook based transmission, the utilization to the maximum power has been supported in the related art, that is, full power sending is supported. For the codebook based transmission, full power sending can be supported for only the UE with full coherent capability, but cannot be supported for the UE with partial coherent capability or non coherent capability.

The full power sending not being supported for the UE with partial coherent capability or non coherent capability is embodied in the two aspects described below.

1. The UE cannot use a codeword exceeding the coherent capability of the UE. For example, a UE supporting only non coherent capability cannot use a codeword of partial coherent capability or full coherent capability. A UE supporting partial coherent capability and non coherent capability cannot use a codeword of full coherent capability. For example, in Table 2, the UE with non coherent capability can use only TPMIs 0 to 3, the UE with partial coherent capability (where non coherent capability may be supported) may use TPMIs 0 to 11, and the UE with full coherent capability (where partial capability and non coherent capability may be supported) may use all codewords.

2. The maximum sending power of each antenna port is limited to a reciprocal value of the maximum number of antenna ports multiplying with the maximum sending power. For example, when a maximum of 4 antenna ports are supported, the maximum power of each antenna port is limited to ¼ of the maximum sending power of the UE.

That is, when a maximum of 4 antenna ports are supported, for the UE with non coherent capability, only one antenna port can be selected in the manner of antenna selection to perform sending, and the maximum sending power of the one antenna port is ¼ of the maximum allowable power of the UE. The actual sending power of the one port is ¼ of the allowable power of uplink transmission of the UE.

It is generally regarded that in the case where a codeword of full coherent capability is used for the UE with non coherent capability, the interference between antenna ports is uncontrollable since phases cannot be adjusted as required between antenna ports. That is, the phase difference between antenna ports is random. However, if only the solution of antenna selection is used, for example, 1 antenna port is selected from 4 antenna ports, it is equivalent to directly losing ¾ of the sending power, and this loss has a considerable impact on performance.

Therefore, an intelligent system should not have such a power limit. The UE with non coherent capability should be allowed to use the codeword of partial coherent capability and the codeword of full coherent capability. The UE with partial coherent capability should be allowed to use the codeword of full coherent capability.

As shown in FIG. 1, an embodiment of the present disclosure provides a power control implementation method. The method is applied to a first communication node and includes the steps described below.

In step 101, information about TPMI is acquired.

In step 102, one or more precoding codewords in a preconfigured precoding codeword set are determined according to the information about TPMI.

In step 103, transmission is performed to a second communication node according to the one or more precoding codewords.

The transmission may be for information, data, a data packet, a data frame and the like. The step in which the transmission is performed according to the one or more precoding codewords refers to that the transmission is performed by using the one or more precoding codewords as a precoder, or the transmission is performed by using the one or more precoding codewords as a reference precoder. The reference precoding refer to that the phase difference between antenna ports for transmission is not strictly configured according to the requirement of a precoding codeword, and there is an extra phase deviation instead. The extra phase deviation may be random, or may be the sum of a random phase and a non random phase.

In an embodiment of the present disclosure, the first communication node may be a UE, a mobile device, an access terminal, a user terminal, a user station, a user unit, a mobile station, a remote station, a remote terminal, a user agent, a user apparatus or the like. The second communication node may be a base station, an access point (AP), a node B, a radio network controller (RNC), an evolved Node B (eNB), a base station controller (BSC), a base transceiver station (BTS), a base station (BS), a transceiver function (TF), a radio router, a radio transceiver, a basic service unit, an extended service unit, a radio base station (RBS) or the like.

According to the embodiments of the present disclosure, the first communication node with non coherent capability/partial coherent capability can also perform full power sending, so that with the support of the capability of the first communication node, better decoding performance and larger coverage may be achieved.

In an embodiment of the present disclosure, a description is given below using an example where the first communication node is a UE and the second communication node is a base station.

In an embodiment, the precoding codeword set includes a precoding codeword exceeding coherent capability of the first communication node.

Since the precoding codeword set contains the precoding codeword exceeding the coherent capability of the first communication node, different full power sending solutions are supported in an embodiment of the present disclosure. The base station and/or UE may select the most appropriate solution according to actual application scenarios.

In an embodiment, the precoding codeword set includes: a precoding codeword conforming to the coherent capability of the first communication node and a part of precoding codewords exceeding the coherent capability of the first communication node; or a precoding codeword conforming to the coherent capability of the first communication node and all precoding codewords exceeding the coherent capability of the first communication node; or a part of precoding codewords for full antenna port; or all precoding codewords for full antenna port.

For ease of description, conventional codewords are divided into three types: a codeword for an antenna port selection, a codeword for an antenna port group selection and a codeword for full antenna port.

Conventional mode: For a UE with non coherent capability, only the codeword for antenna port selection can be used. For a UE with partial coherence capability, the codeword for antenna port selection and the codeword for antenna port group selection may be used. For a UE with full coherent capability, the preceding three types of codewords may be used.

Extension mode 1: For a UE with non coherent capability and a UE with partial coherent capability, it is allowed to use extension codeword set 1 in addition to a codeword that may be used in the conventional mode (a precoding codeword conforming to the coherent capability of the UE). Extension set 1 includes a part of precoding codewords exceeding the coherent capability of the UE.

Extension mode 2: For a UE with non coherent capability and a UE with partial coherent capability, it is allowed to use extension codeword set 2 in addition to a codeword that may be used in the conventional mode (a precoding codeword conforming to the coherent capability of the UE). Extension set 2 includes all precoding codewords exceeding the coherent capability of the UE.

Extension mode 3: For a UE with non coherent capability and a UE with partial coherent capability, it is allowed to use only a part or all of full antenna port codewords of the third types above.

Using a UE supporting the transmission of 2 antenna ports as an example, when the UE supports only non coherent capability, the UE can select the antenna port selection mode with TPMIs 0 and 1 in the conventional mode, as shown in Table 1. Using the preceding extension modes, the UE may be configured to support the following codeword sets: nonCoherent0={0, 1}—conventional mode; nonCoherent1={0, 1, 2}—extension mode 1; nonCoherent2={2}—extension mode 3; nonCoherent3={0, 1, 2, 3, 4, 5}—extension mode 2.

In an embodiment, the method further includes that: the preconfigured precoding codeword set is determined in the following manners: a parsing mode of the information about TPMI is acquired, and the precoding codeword set is determined according to the parsing mode.

For example, the UE receives radio resource control (RRC) signaling sent by the base station, where the RRC signaling carries the parsing mode of a TPMI field in downlink control information (DCI); the UE determines, according to the parsing mode, the precoding codeword set used by the base station.

The TPMI field in the DCI is used for indicating a codeword in a certain one of the preceding sets. As shown in Table 3, which column in Table 3 is to be used to resolve the TPMI field in the DCI depends on the configuration of higher layer signaling, such as the configuration of the RRC signaling. For example, only one of the preceding sets may be configured through the RRC signaling; or more than one of the preceding sets are configured through the RRC signaling, and one set thereof is activated through media access control (MAC) layer signaling.

TABLE 3

| Bit Field Mapped to a Index | Codebook Subset = nonCoherent0 | Codebook Subset = nonCoherent1 | Codebook Subset = nonCoherent2 | Codebook Subset = nonCoherent3 |
|---|---|---|---|---|
| 0 | 1 layer: TPMI = 0 | 1 layer: TPMI = 0 | 1 layer: TPMI = 2 | 1 layer: TPMI = 0 |
| 1 | 1 layer: TPMI = 1 | 1 layer: TPMI = 1 | 2 layers: TPMI = 0 | 1 layer: TPMI = 1 |
| 2 | 2 layers: TPMI = 0 | 1 layer: TPMI = 2 | | 1 layer: TPMI = 2 |
| 3 | Reserved | 2 layers: TPMI = 0 | | 1 layer: TPMI = 3 |
| 4 | | | | 1 layer: TPMI = 4 |

TABLE 3-continued

| Bit Field Mapped to a Index | Codebook Subset = nonCoherent0 | Codebook Subset = nonCoherent1 | Codebook Subset = nonCoherent2 | Codebook Subset = nonCoherent3 |
|---|---|---|---|---|
| 5 | | | | 1 layer: TPMI = 5 |
| 6 | | | | 2 layers: TPMI = 0 Reserved |

It is to be noted that the preceding sets list a TPMI of 1 layer, which specifically represents codewords in the large set in Table 1. In Table 3, the value range of the TPMI field in the DCI depends on the number of elements in a set. In the conventional mode, codewords of 2 layers are as shown in Table 4. Since TPMI 0 can be sent at full power, no further improvement is needed. Thus, in Table 3, 2 layers have only TPMI 0.

The overhead of the TPMI in the DCI is analyzed as below: nonCoherent0 needs 2 bits, nonCoherent1 needs 2 bits, nonCoherent2 needs 1 bit, and nonCoherent3 needs 3 bits. If the base station configures the UE to use extension mode 3, the DCI overhead is minimum. If extension mode 4 is supported, the DCI overhead is maximum.

TABLE 4

| TPMI Index | W (TPMI indexes from left to right correspond to values from small to large) | | |
|---|---|---|---|
| 0-2 | $\frac{1}{\sqrt{2}}\begin{bmatrix}1 & 0\\ 0 & 1\end{bmatrix}$ | $\frac{1}{2}\begin{bmatrix}1 & 1\\ 1 & -1\end{bmatrix}$ | $-\frac{1}{2}\begin{bmatrix}1 & 1\\ j & -j\end{bmatrix}$ |

Using a UE supporting the transmission of 4 antenna ports as an example, when the UE supports only non coherent capability, the UE can select the antenna port selection mode with TPMIs 0 to 3 in the conventional mode, as shown in Table 2. Using the preceding extension modes, the UE may be configured to support the following codeword sets: nonCoherent0={0, 1, 2, 3}—conventional mode; nonCoherent1={0, 1, 2, 3, 4, 8, 12}—extension mode 1; nonCoherent2={4, 8, 12}—extension mode 3; nonCoherent3={0, 1, 2, . . . , 27}—extension mode 2.

In an embodiment, in the case where the one or more precoding codewords include a precoding codeword exceeding the coherent capability of the first communication node, the phase difference between non coherent antenna ports for the transmission is the same as or different from the phase difference between antenna ports of the precoding codeword.

When the base station indicates to the UE a precoding codeword exceeding the coherent capability of the UE to perform transmission, the phase difference between sending antenna ports of the UE is allowed to be not equal to the phase difference between antenna ports of indicated precoding codewords.

That is, for the UE with non coherent capability, although the codeword of partial coherent capability and the codeword of full coherent capability may be used, the phase difference required by the codeword does not need to be satisfied between multiple antenna ports of the UE.

In an embodiment, the phase difference between the non coherent antenna ports for the transmission is a random phase.

When the base station indicates to the UE the precoding codeword exceeding the coherent capability of the UE to perform the transmission, the phase difference between the sending antenna ports of the UE is allowed to be not equal to the phase difference between the antenna ports of the indicated precoding codewords, and the phase difference between the sending antenna ports of the UE is random instead. That is, there is a random phase difference between the non coherent antenna ports.

In an embodiment, the phase difference between the non coherent antenna ports for the transmission is determined by a random phase and a non random phase jointly.

When the base station indicates to the UE the precoding codeword exceeding the coherent capability of the UE to perform the transmission, the phase difference between the sending antenna ports of the UE is allowed to be not equal to the phase difference between the antenna ports of the indicated precoding codewords, and the phase difference between the sending antenna ports of the UE is random instead. On this basis, the UE is further allowed to use time domain delay cyclic delay diversity (CDD) technology and the like. In such technology, the phase difference generated between antenna ports is not random, but predictable, that is, the phase difference is a non random phase.

In an embodiment, the phase difference between the non coherent antenna ports for the transmission includes at least one of the following: a random phase, or a phase introduced by a time domain delay CDD.

In an embodiment, in the case where the one or more precoding codewords include the precoding codeword exceeding the coherent capability of the first communication node, the phase difference between the non coherent antenna ports for the transmission is equal to the phase difference between the antenna ports of the precoding codewords plus a first phase offset.

In an embodiment, the first phase offset is determined in at least one of the following manners: a predetermined manner, for example, specifying the maximum value through a protocol; determining the first phase offset by the first communication node; determining the first phase offset according to signaling configured by the second communication node; or determining the first phase offset according to a transmission mode of the time domain delay CDD.

In an embodiment, the method further includes that: the maximum value of the first phase offset is reported to the second communication node.

For example, in the case of 2 antenna ports, original TPMI2={1 1}, which may be inapplicable to the UE with non coherent capability, so the UE is allowed to use TPMI2={1 $e^{j*alpha}$}, where alpha denotes an arbitrary phase.

For example, in the case of 4 antenna ports, original TPMI2={1 1 1 −1}, which may be inapplicable to the UE with non coherent capability, so the UE is allowed to use TPMI2={1 $e^{j*alpha1}$, $e^{j*alpha2}$, $e^{j*alpha3}$}, where each of alpha1, alpha2 and alpha3 denotes an arbitrary phase.

For the UE with partial coherent capability, although the codeword of full coherent capability may be used, the phase difference required by the codeword does not need to be satisfied between all antenna ports of the UE. An antenna group of the UE with partial coherent capability supports coherent capability. Antenna ports within the group support joint phase adjustment. Antenna ports between groups cannot jointly adjust the phase.

For example, in the case of 4 antenna ports, original TPMI12={1 1 1 −1}, and the strict phase difference may be inapplicable to the UE with partial coherent capability. However, antenna ports 0 and 2 are in a group, and the phase difference can be controlled; antenna port 1/3 is in a group, and the phase difference can also be controlled. Therefore, the UE is allowed to use TPMI12={$1e^{j*alpha1}$ 1−1*$e^{j*alpha1}$}, where alpha1 denotes an arbitrary phase.

The preceding arbitrary phases alpha, or alpha1, alpha2 and alpha3 are collectively referred to as random phases.

The random phase may be a random phase offset between multiple antenna ports, or may refer to a phase offset introduced by cyclic small delay, or may include the sum of a random phase offset between multiple antenna ports and a phase offset introduced by cyclic small delay.

It is to be noted that the preceding arbitrary phase may be an arbitrary constant or a function of time and/or frequency domain, that is, phases on different symbols and/or different sub-carriers may be different.

The random phase may further be for a sub-carrier group. That is, multiple sub-carriers in each sub-carrier group have the same random phase.

An extension codebook may further be obtained in the manner of TPMI joint indication.

In an embodiment, multiple precoding codewords correspond to different antenna port groups, or different antenna panels, or different antenna panel groups.

In a scenario of simultaneous transmission of multiple antenna panels, more generally, in a scenario of simultaneous transmission of multiple antenna port groups, the phase difference within an antenna port group is generally easy to control, while the phase difference between antenna ports is not easy to control, so the phase difference between antenna port groups is arbitrary. Different TPMIs may be used for different antenna port groups, or antenna panels, or antenna panel groups.

When each TPMI corresponds to a respective antenna port group, the number of rows of elements in a codeword of each TPMI corresponds to the number of antenna ports of the respective antenna port group, and the number of columns of elements in the codeword of each TPMI corresponds to the number of layers carried by the respective antenna port group.

For example, TPMI={2, 3} in a codebook of two antenna ports is used for one layer transmission of 2 antenna port groups. TPMI={2} is used for a first antenna port group, and TPMI={3} is used for a second antenna port group. The phase between ports within the antenna port group may be controlled and set according to a corresponding element in a codeword of a corresponding TPMI. The phase between antenna port groups is random.

Each antenna port group has 2 antenna ports. A codeword of the 2 antenna port groups may be described as ½ [1 1 1*$e^{j\alpha}$−1*$e^{j\alpha}$]$^T$, α where α denotes any phase.

Alternatively, a codeword of the 2 antenna port groups may be described as ½ [1 1 1*$e^{j\alpha}$−1*$e^{j\alpha}$]$^T$, where α denotes any phase.

Multiple TPMIs may correspond to one antenna port group. Codewords of the multiple TPMIs may be combined into a new codeword matrix, which is used for the one antenna port group. The number of rows of the new codeword matrix corresponds to the number of antenna ports of the one antenna port group. The number of columns of the new codeword matrix corresponds to the number of layers carried by the one antenna port group.

For example, TPMI={2, 3, 4, 5} in a codebook of 2 antenna ports is used for 2 layer transmission of 2 antenna port groups. TPMI={2, 3} is used for a first antenna port group, and TPMI={4, 5} is used for a second antenna port group. The phase between ports within an antenna port group may be controlled and set according to a corresponding element in a codeword of a corresponding TPMI. The phase between antenna port groups is random. Each antenna port group has 2 antenna ports and carries 2 layers. A codeword of the 2 antenna port groups may be described as $$\frac{1}{2\sqrt{2}}\begin{bmatrix} 1 & 1 \\ 1 & -1 \\ 1*e^{j\alpha} & 1*e^{j\alpha} \\ j*e^{j\alpha} & -j*e^{j\alpha} \end{bmatrix},$$

where α denotes any phase.

Alternatively, a codeword of the 2 antenna port groups may be described as $$\frac{1}{2\sqrt{2}}\begin{bmatrix} 1 & 1 \\ 1*e^{-j\alpha} & -1*e^{j\alpha} \\ 1 & 1 \\ j*e^{j\alpha} & -j*e^{j\alpha} \end{bmatrix},$$

where α denotes any phase.

For example, TPMI={2, 3, 4, 5} in a codebook of two antenna ports is used for 1 layer transmission of 2 antenna port groups. TPMI={2, 3} is used for a first antenna port group, and TPMI={4, 5} is used for a second antenna port group. The phase between ports within an antenna port group may be controlled and set according to a corresponding element in a codeword of a corresponding TPMI. The phase between antenna port groups is random. Each antenna port group has 4 antenna ports and carries 1 layer. A codeword of the 2 antenna port groups is described as:

$$\frac{1}{2\sqrt{2}}\begin{bmatrix} 1 & 1 & 1 & -1 & 1*e^{j\alpha} & j*e^{j\alpha} & 1*e^{j\alpha} & -j*e^{j\alpha} \end{bmatrix}^T,$$

where α denotes any phase.

The information about TPMI indicated to the UE by the base station may include multiple TPMIs or a predefined and combined TPMI indication. That is, multiple TPMIs are used for different antenna port groups.

The antenna port group may include: an antenna panel or an antenna panel group.

In an embodiment, the method further includes that: at least one of the following information is reported to the second communication node: information about coherence capability of antenna ports, information about a supported codebook level, information about a supported cyclic delay capability, or information about power scaling for different codewords or different codeword groups.

In an embodiment, the information about the coherent capability of the antenna port includes at least one of the following: non coherent capability, partial coherent capability or full coherent capability; and the information about the supported codebook level includes at least one of the following: a codeword designed for multiple antenna ports with a highest coherent capability as partial coherent capability, or a codeword designed for multiple antenna ports with a highest coherent capability as full coherent capability.

For example, a UE that supports only a multi-antenna port with non coherent capability supports the use of a codeword designed for a multi-antenna port with partial coherent capability, or a UE that supports only a multi-antenna port with non coherent capability supports the use of a codeword designed for a multi-antenna port with full coherent capability, or a UE that supports a multi-antenna port with partial coherence capability supports the use of a codeword designed for a multi-antenna port with full coherence capability.

For a UE supporting cyclic delay capability, the base station is more likely to configure the UE with a codeword higher than the multi-antenna port coherent capability of the UE.

Power scaling being reported for codewords or codeword groups separately is supported.

The reporting to the base statin by the UE supports the capability of reporting power scaling coefficients for codewords or codeword groups separately.

The UE reports information about reporting power scaling coefficients for different codewords or different codeword groups separately to the base station.

For example, for a UE supporting 2 antenna ports, a power scaling coefficient is reported according to a TPMI in Table 1. When TPMI=0, the power scaling coefficient is 1, indicating that antenna port 0 of the UE supports full power sending. When TPMI=1, the power scaling coefficient is 1/sqrt (2), indicating that antenna port 1 of the UE does not support full power sending. For a TPMI the same as that in Table 1, a power scaling coefficient may not be reported and is regarded to be consistent with a coefficient corresponding to the existing codebook by default.

For another example, for a UE supporting 4 antenna ports, a power scaling coefficient is reported according to a TPMI in Table 2. When TPMI=0, the power scaling coefficient is 1, indicating that antenna port 0 of the UE supports full power sending. When TPMI=4, the power scaling coefficient is 1/sqrt (2), indicating that antenna ports 1 and 2 may support full power sending. A TPMI whose power scaling coefficient is not reported has the same coefficient as that in the existing codebook by default.

A power scaling factor may further be reported according to a codeword group.

For example, for a UE supporting 2 antenna ports, a power scaling coefficient is reported according to a TPMI in Table 1. TPMIs 0 and 1 belong to codewords with non coherent capability and are thus divided into a group. When the power scaling coefficient is 1, antenna ports 0 and 1 corresponding to TPMIs 0 and 1 support full power sending, respectively.

For another example, for a UE supporting 4 antenna ports, a power scaling coefficient is reported according to a TPMI in Table 2. TPMIs 0 to 3 belong to codewords with non coherent capability and are thus divided into a group. When the power scaling coefficient is 1, it is indicated that antenna ports 0 to 3 corresponding to TPMIs 0 to 3 support full power sending, respectively. When a group of codewords with TPMIs 0 to 3 each have a power scaling coefficient of 1/sqrt (2), it is indicated that each antenna may support half the maximum full power. Codewords with TPMIs 4 to 11 belong to partial coherent capability and may be divided into a group. When the power scaling coefficient is 1/sqrt (2), it is indicated that two antenna ports with coherent capability may implement the maximum full power sending.

The preceding examples describe a method for directly configuring a power scaling factor corresponding to a TPMI. The scaling factor may further be a relative value. For example, for a UE supporting 4 antenna ports, TPMIs in Table 2 are 0 to 3, if the relative power scaling factor is 1, a coefficient in Table 2 are maintained; and if the relative scaling factor is sqrt (2), an actual coefficient is the coefficient in Table 2 multiplied by a relative coefficient.

It is to be noted that coefficients of various codewords in a codebook do not actually determine the power distribution between various ports. The UE calculates the actual sending power for certain transmission, and then determines power scaling factors (assumed to be a second power scaling factor) for all antenna ports according to a power scaling factor (assumed to be a first power scaling factor) of a codeword corresponding to the transmission. The second power scaling factor is equal to the square root of the product of the square of the power scaling factor of the codeword corresponding to the transmission and the number of non-zero elements in a matrix of the codeword. For example, for TPMI 0 in Table 1, if the first scaling factor is 1, the second power scaling factor is 1. For TPMI 2 in Table 1, if the first scaling factor is 1/sqrt(2), the second power scaling factor is 1. Finally, the actual sending power is multiplied by the second power scaling factor and then distributed over non-zero power antenna ports.

Figure 2:
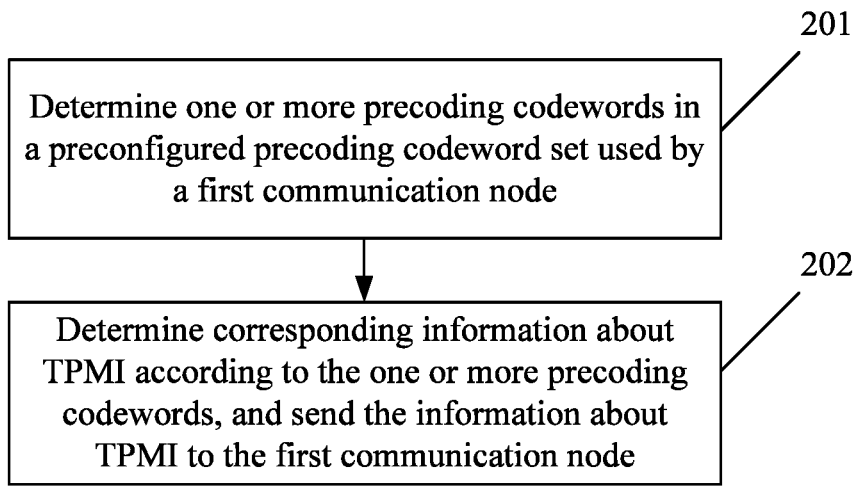
FIG. 2 is a flowchart of a power control implementation method according to an embodiment of the present disclosure (at a second communication node side).

As shown in FIG. 2, an embodiment of the present disclosure provides a power control implementation method. The method is applied to a second communication node and includes the steps described below.

In step 201, one or more precoding codewords in a preconfigured precoding codeword set used by a first communication node are determined.

In step 202, corresponding information about TPMI is determined according to the one or more precoding codewords, and the information about TPMI is sent to the first communication node.

According to the embodiment of the present disclosure, the first communication node with non coherent capability/partial coherent capability can also perform full power sending, so that with the support of the capability of the first communication node, better decoding performance and larger coverage can be achieved.

In an embodiment, the precoding codeword set includes a precoding codeword exceeding coherent capability of the first communication node.

Since the precoding codeword set contains the precoding codeword exceeding the coherent capability of the first communication node, different full power sending solutions are supported in an embodiment of the present disclosure. A base station and/or UE may select the most appropriate solution according to actual application scenarios.

In an embodiment, before step 201, the receiving end performance evaluation may further be performed for the UE, and it is determined, according to the performance evaluation result, that one or more precoding codewords exceeding the coherent capability of the UE are selected for the UE.

In the performance evaluation result, if the performance loss caused by random interference between antenna ports is greater than the performance loss due to power reduction caused by decreasing of the number of antenna ports, then a mode of decreasing antenna ports is used, that is, an antenna port selection mode or an antenna port group selection mode; otherwise, a non antenna port (group) selection mode is used, that is, all antenna ports may be used and the negative impact caused by random interference between antenna ports may be accepted.

The evaluation method includes: the antenna port (group) selection or the non antenna port (group) selection is selected for use on the basis of the performance of a receiving end. For example, the receiving performance of the antenna port (group) selection mode is compared with the receiving performance of the non-antenna port (group) selection mode, and whichever mode has better performance is selected.

In the power control of uplink transmission, if the UE selects one of the preceding two solutions, the base station may provide certain information about the receiving end performance to the UE.

In an embodiment, the method further includes: a parsing mode of the information about TPMI is sent to the first communication node to enable the first communication node to determine the precoding codeword set according to the parsing mode.

For example, a TPMI field in DCI is used for indicating a codeword in a certain one of the preceding sets. As shown in Table 3, which column in Table 3 is to be used to resolve the TPMI field in the DCI depends on the configuration of higher layer signaling, such as the configuration of RRC signaling. For example, only one of the preceding sets may be configured through the RRC signaling; or more than one of the preceding sets are configured through the RRC signaling, and one set thereof is activated through MAC layer signaling.

In an embodiment, the precoding codeword set includes: a precoding codeword conforming to the coherent capability of the first communication node and a part of precoding codewords exceeding the coherent capability of the first communication node; or a precoding codeword conforming to the coherent capability of the first communication node and all precoding codewords exceeding the coherent capability of the first communication node; or a part of full antenna port precoding codewords; or all full antenna port precoding codewords.

The modes described below may be used.

Conventional mode: For a UE with non coherent capability, only an antenna port selection codeword can be used. For a UE with partial coherence capability, an antenna port selection codeword and an antenna port group selection codeword may be used. For a UE with full coherent capability, the preceding three types of codewords may be used.

Extension mode 1: For a UE with non coherent capability and a UE with partial coherent capability, it is allowed to use extension codeword set 1 in addition to a codeword that may be used in the conventional mode (the precoding codeword conforming to the coherent capability of the UE). Extension set 1 includes a part of precoding codewords exceeding the coherent capability of the UE.

Extension mode 2: For a UE with non coherent capability and a UE with partial coherent capability, it is allowed to use extension codeword set 2 in addition to a codeword that may be used in the conventional mode (the precoding codeword conforming to the coherent capability of the UE). Extension set 2 includes all precoding codewords exceeding the coherent capability of the UE.

Extension mode 3: For a UE with non coherent capability and a UE with partial coherent capability, it is allowed to use only a part or all of full antenna port codewords of the third type above.

In an embodiment, the method further includes: it is indicated that the phase difference between non coherent antenna ports for transmission performed by the first communication node is the same as or different from the phase difference between antenna ports of precoding codeword.

When the base station indicates to the UE a precoding codeword exceeding the coherent capability of the UE to perform the transmission, the phase difference between sending antenna ports of the UE is allowed to be not equal to the phase difference between antenna ports of indicated precoding codewords.

In an embodiment, the method further includes that: a first phase offset of the first communication node is configured through signaling. The phase difference between the non coherent antenna ports for the transmission is equal to the phase difference between the antenna ports of the precoding codewords plus a first phase offset.

In an embodiment, before the step in which the first phase offset of the first communication node is configured through the signaling, the method further includes that: the maximum value of the first phase offset reported by the first communication node is received.

For the UE with partial coherent capability, although a codeword of full coherent capability may be used, the phase difference required by the codeword does not need to be satisfied between all antenna ports of the UE. An antenna group of the UE with partial coherent capability supports coherent capability. Antenna ports within the group support joint phase adjustment. Antenna ports between groups cannot jointly adjust the phase.

In an embodiment, the method further includes that: the following information reported by the first communication node are received: information about coherent capability of antenna ports, information about a supported codebook level, information about a supported cyclic delay capability, or information about power scaling for different codewords or different codeword groups.

In an embodiment, the information about the coherent capability of the antenna port includes at least one of the following: non coherent capability, partial coherent capability or full coherent capability; and the information about the supported codebook level includes at least one of the following: a codeword designed for multiple antenna ports with a highest coherent capability as partial coherent capability, or a codeword designed for multiple antenna ports with a highest coherent capability as full coherent capability.

For example, a UE supports only a multi-antenna port with non coherent capability supports the use of a codeword designed for a multi-antenna port with partial coherent capability, or a UE supports only a multi-antenna port with non coherent capability supports the use of a codeword designed for a multi-antenna port with full coherent capability, or a UE supports a multi-antenna port with partial coherence capability supports the use of a codeword designed for a multi-antenna port with full coherence capability.

For a UE supporting cyclic delay capability, the base station is more likely to configure the UE with a codeword higher than the multi-antenna port coherent capability of the UE.

Power scaling being reported for codewords or codeword groups separately is supported in the manner described below.

For example, for a UE supporting 2 antenna ports, a power scaling coefficient is reported according to a TPMI in Table 1. When TPMI=0, the power scaling coefficient is 1, indicating that antenna port 0 of the UE supports full power sending. When TPMI=1, the power scaling coefficient is 1/sqrt (2), indicating that antenna port 1 of the UE does not support full power sending. For a TPMI the same as that in Table 1, a power scaling coefficient may not be reported and is regarded to be consistent with a coefficient corresponding to the existing codebook by default.

For another example, for a UE supporting 4 antenna ports, a power scaling coefficient is reported according to a TPMI in Table 2. When TPMI=0, the power scaling coefficient is 1, indicating that antenna port 0 of the UE supports full power sending. When TPMI=4, the power scaling coefficient is 1/sqrt (2), indicating that antenna ports 0 and 2 may support full power sending. A TPMI whose coefficient is not reported has the same coefficient as that in the existing codebook by default.

A power scaling factor may further be reported according to a codeword group.

For example, for a UE supporting 2 antenna ports, a power scaling coefficient is reported according to a TPMI in Table 1. TPMIs 0 and 1 belong to codewords with non coherent capability and are thus divided into a group. When the power scaling coefficient is 1, antenna ports 0 and 1 corresponding to TPMIs 0 and 1 support full power transmission, respectively.

For another example, for a UE supporting 4 antenna ports, a power scaling coefficient is reported according to a TPMI in Table 2. TPMIs 0 to 3 belong to codewords with non coherent capability and are thus divided into a group. When the power scaling coefficient is 1, antenna ports 0 to 3 corresponding to TPMIs 0 to 3 support full power sending, respectively. When a group of codewords with TPMIs 0 to 3 each have a power scaling coefficient of 1/sqrt (2), it is indicated that each antenna may support half the maximum full power. Codewords with TPMIs 4 to 11 belong to partial coherent capability may be divided into a group. When the power scaling coefficient is 1/sqrt (2), it is indicated that two antenna ports having coherent capability may implement the maximum full power sending.

The preceding examples describe a method for directly configuring a power scaling coefficient corresponding to a TPMI. The scaling factor may further be a relative value. For example, for a UE supporting 4 antenna ports, TPMIs in Table 2 are 0 to 3, if the relative power scaling factor is 1, coefficients in Table 2 are maintained; if the relative scaling factor is sqrt (2), an actual coefficient is equal to a coefficient in Table 2 multiplied by a relative coefficient.

It is to be noted that coefficients of various codewords in a codebook do not actually determine the power distribution between various ports. To reach full power, all power should be distributed on non-zero power antenna ports.

Figure 3:
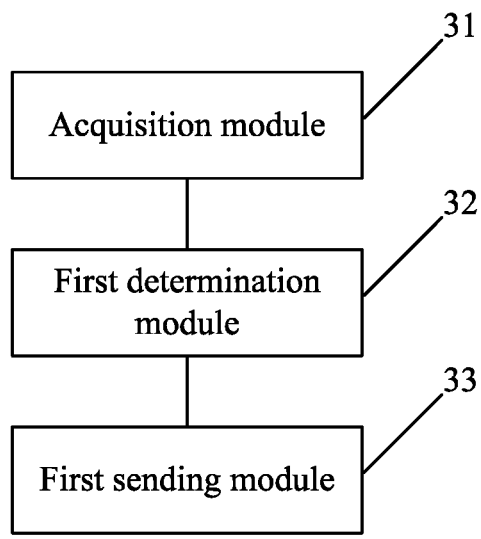
FIG. 3 is a diagram of a power control implementation apparatus according to an embodiment of the present disclosure (at a first communication node side).

As shown in FIG. 3, an embodiment of the present disclosure further provides a power control implementation apparatus. The apparatus includes an acquisition module 31, a first determination module 32 and a first sending module 33. The acquisition module 31 is configured to acquire information about TPMI. The first determination module 32 is configured to determine one or more precoding codewords in a preconfigured precoding codeword set according to the information about TPMI. The first sending module 33 is configured to perform transmission to a second communication node according to the one or more precoding codewords.

In an embodiment, the precoding codeword set includes a precoding codeword exceeding coherent capability of the first communication node.

In an embodiment, the first determination module 32 is further configured to determine the preconfigured precoding codeword set such that: acquire a parsing mode of the information about TPMI, and determine the precoding codeword according to the parsing mode.

In an embodiment, the precoding codeword set includes: a precoding codeword conforming to the coherent capability of the first communication node and a part of precoding codewords exceeding the coherent capability of the first communication node; or a precoding codeword conforming to the coherent capability of the first communication node and all precoding codewords exceeding the coherent capability of the first communication node; or a part of full antenna port precoding codewords; or all full antenna port precoding codewords.

In an embodiment, in the case where the one or more precoding codewords includes a precoding codeword exceeding the coherent capability of the first communication node, the phase difference between non coherent antenna ports for the transmission is the same as or different from the phase difference between antenna ports of precoding codeword.

In an embodiment, the phase difference between the non coherent antenna ports for the transmission is a random phase, or the phase difference between the non coherent antenna ports for the transmission is determined by a random phase and a nonrandom phase jointly.

In an embodiment, the phase difference between the non coherent antenna ports for the transmission includes at least one of the following: a random phase, or a phase introduced by a time domain delay CDD.

In an embodiment, in the case where the one or more precoding codewords includes the precoding codeword exceeding the coherent capability of the first communication node, the phase difference between the non coherent antenna ports for the transmission is equal to the phase difference between the antenna ports of the precoding codewords plus a first phase offset.

In an embodiment, the first phase offset is determined in at least one of the following manners: a predetermined manner, determining the first phase offset by the first communication node, determining the first phase offset according to signaling configured by the second communication node, or determining the first phase offset according to a transmission mode of the time domain delay CDD.

In an embodiment, the apparatus further includes a reporting module. The reporting module is configured to report the maximum value of the first phase offset to the second communication node.

In an embodiment, multiple precoding codewords correspond to different antenna port groups, or different antenna panels, or different antenna panel groups.

In an embodiment, the reporting module is further configured to report the following information to the second communication node: information about coherent capability of antenna ports, information about a supported codebook level, information about a supported cyclic delay capability, or information about power scaling for different codewords or different codeword groups.

In an embodiment, the information about the coherent capability of the antenna port includes at least one of the following: non coherent capability, partial coherent capability or full coherent capability; and the information about the supported codebook level includes at least one of the following: a codeword designed for multiple antenna ports with a highest coherent capability as partial coherent capability, or a codeword designed for multiple antenna ports with a highest coherent capability as full coherent capability.

According to the embodiments of the present disclosure, a communication node with non coherent capability/partial coherent capability can also perform full power sending, so that with the support of the capability of the communication node, better decoding performance and larger coverage can be achieved.

Figure 4:
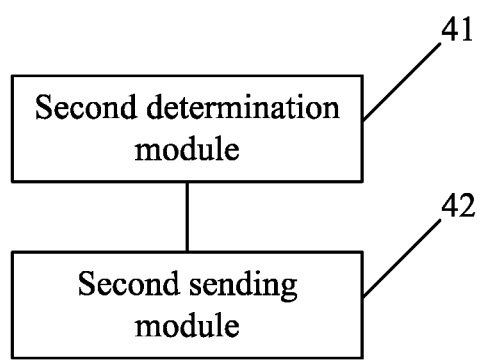
FIG. 4 is a diagram of a power control implementation apparatus according to an embodiment of the present disclosure (at a second communication node side).

As shown in FIG. 4, an embodiment of the present disclosure further provides a power control implementation apparatus. The apparatus includes a second determination module 41 and a second sending module 42. The second determination module 41 is configured to determine one or more precoding codewords in a preconfigured precoding codeword set used by a first communication node. The second sending module 42 is configured to determine corresponding information about TPMI according to the one or more precoding codewords, and send the information about TPMI to the first communication node. In an embodiment, the precoding codeword set includes a precoding codeword exceeding coherent capability of the first communication node.

In an embodiment, the second sending module 42 is further configured to send a parsing mode of the information about TPMI to the first communication node to enable the first communication node to determine the precoding codeword set according to the parsing mode.

In an embodiment, the precoding codeword set includes: a precoding codeword conforming to the coherent capability of the first communication node and a part of precoding codewords exceeding the coherent capability of the first communication node; or a precoding codeword conforming to the coherent capability of the first communication node and all precoding codewords exceeding the coherent capability of the first communication node; or a part of precoding codewords for full antenna port; or all precoding codewords for full antenna port.

In an embodiment, the second sending module 42 is further configured to indicate that the phase difference between non coherent antenna ports for transmission performed by the first communication node is the same as or different from the phase difference between antenna ports of precoding codeword.

In an embodiment, the second sending module 42 is further configured to: configure a first phase offset of the first communication node through signaling. The phase difference between the non coherent antenna ports for the transmission is equal to the phase difference between the antenna ports of the precoding codewords plus the first phase offset.

In an embodiment, the apparatus further includes a receiving module. The receiving module is configured to receive the maximum value of the first phase offset reported by the first communication node.

In an embodiment, the receiving module is further configured to receive the following information reported by the first communication node: information about coherent capability of antenna ports, information about a supported codebook level, information about a supported cyclic delay capability, or information about power scaling for different codewords or different codeword groups.

In an embodiment, the information about the coherent capability of the antenna port includes at least one of the following: non coherent capability, partial coherent capability or full coherent capability; and the information about the supported codebook level includes at least one of the following: a codeword designed for multiple antenna ports with a highest coherent capability as partial coherent capability, or a codeword designed for multiple antenna ports with a highest coherent capability as full coherent capability.

According to the embodiments of the present disclosure, a communication node with non coherent capability/partial coherent capability can also perform full power sending, so that with the support of the capability of the communication node, better decoding performance and larger coverage can be achieved.

An embodiment of the present disclosure further provides a communication node. The communication node includes a memory, a processor, and a computer program stored in the memory and executable by the processor. The processor, when executing the program, implements the power control implementation method shown in FIG. 1.

An embodiment of the present disclosure further provides a communication node. The communication node includes a memory, a processor, and a computer program stored in the memory and executable by the processor. The processor, when executing the program, implements the power control implementation method shown in FIG. 2.

An embodiment of the present disclosure further provides a computer-readable storage medium. The storage medium stores computer-executable instructions for executing the power control implementation method described above.

In an embodiment, the storage medium may include, but is not limited to, a universal serial bus flash disk, a read-only memory (ROM), a random access memory (RAM), a mobile hard disk, a magnetic disk, an optical disk and various media capable of storing program codes.

It is to be understood by those having ordinary skill in the art that some or all steps of the method described above and function modules/units in the system or apparatus described above may be implemented as software, firmware, hardware and suitable combinations thereof. In the hardware implementation, the division of the function modules/units described above may not correspond to the division of physical components. For example, one physical component may have multiple functions, or one function or step may be executed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a RAM, a ROM, an electrically erasable programmable read-only memory (EEPROM), a flash memory or other memory technology, a compact disc read-only memory (CD-ROM), a digital video disc (DVD) or other optical disc memories, magnetic cassettes, magnetic tapes, magnetic disk memories or other magnetic storage apparatuses, or any other media that are used for storing the desired information and that may be accessed by a computer. Additionally, as is known to those having ordinary skill in the art, the communication media generally include computer-readable instructions, data structures, program modules or other data in carriers or in modulated data signals transported in other transport mechanisms and may include any information delivery medium.

What is claimed is:

1. A power control implementation method, applied to a user equipment, comprising:
reporting the following information to a base station:
power scaling factors for different codewords or different codeword groups, wherein the different codewords or different codeword groups correspond to different transmit precoding matrix indicators (TPMIs);
acquiring information about TPMI;
determining at least one precoding codeword in a preconfigured precoding codeword set according to the information about TPMI; and
performing transmission to the base station according to the at least one precoding codeword.

2. The method of claim 1, wherein
the precoding codeword set comprises a precoding codeword exceeding coherent capability of the user equipment.

3. The method of claim 1, further comprising: determining the preconfigured precoding codeword set by:
acquiring a parsing mode of the information about TPMI; and
determining the preconfigured precoding codeword set according to the parsing mode.

4. The method of claim 1, wherein the precoding codeword set comprises:
a precoding codeword conforming to coherent capability of the user equipment and a part of precoding codewords exceeding the coherent capability of the user equipment; or
a precoding codeword conforming to coherent capability of the user equipment and all precoding codewords exceeding the coherent capability of the user equipment; or
a part of full antenna port precoding codewords; or
all full antenna port precoding codewords.

5. The method of claim 1, wherein
in a case where the at least one precoding codeword comprises a precoding codeword exceeding coherent capability of the user equipment, a phase difference between non coherent antenna ports for the transmission is the same as or different from a phase difference between antenna ports of the precoding codeword.

6. The method of claim 5, wherein
the phase difference between the non coherent antenna ports for the transmission is a random phase; or
the phase difference between the non coherent antenna ports for the transmission is determined by a random phase and a nonrandom phase jointly.

7. The method of claim 5, wherein the phase difference between the non coherent antenna ports for the transmission comprises at least one of the following:
a random phase, or a phase introduced by a time domain delay cyclic delay diversity (CDD).

8. The method of claim 1, wherein
in a case where the at least one precoding codeword comprises a precoding codeword exceeding coherent capability of the user equipment, a phase difference between non coherent antenna ports for the transmission is equal to a phase difference between antenna ports of precoding codewords plus a first phase offset.

9. The method of claim 8, wherein the first phase offset is determined in at least one of the following manners:
a predetermined manner;
determining the first phase offset by the user equipment;
determining the first phase offset according to signaling configured by the base station; or
determining the first phase offset according to a transmission mode of a time domain delay CDD.

10. The method of claim 8, further comprising:
reporting a maximum value of the first phase offset to the base station.

11. The method of claim 1, wherein
a plurality of precoding codewords correspond to different antenna port groups, or different antenna panels, or different antenna panel groups.

12. The method of claim 1, wherein
information about coherent capability of an antenna port comprises at least one of the following: non coherent capability, partial coherent capability or full coherent capability; and
information about a supported codebook level comprises at least one of the following: a codeword designed for multiple antenna ports with a highest coherent capability as partial coherent capability, or a codeword designed for multiple antenna ports with a highest coherent capability as full coherent capability.

13. A power control implementation method, applied to a base station, comprising:
receiving the following information reported by a user equipment: power scaling factors for different codewords or different codeword groups, wherein the different codewords or different codeword groups correspond to different transmit precoding matrix indicators (TPMIs);
determining at least one precoding codeword in a preconfigured precoding codeword set used by the user equipment; and
determining information about TPMI
according to the at least one precoding codeword, and sending the information about TPMI to the user equipment.

14. The method of claim 13, wherein
the precoding codeword set comprises a precoding codeword exceeding coherent capability of the user equipment.

15. The method of claim 13, further comprising:
sending a parsing mode of the information about TPMI to the user equipment to enable the user equipment to determine the precoding codeword set according to the parsing mode.

16. The method of claim 13, wherein the precoding codeword set comprises:
a precoding codeword conforming to coherent capability of the user equipment and a part of precoding codewords exceeding the coherent capability of the user equipment; or
a precoding codeword conforming to coherent capability of the user equipment and all precoding codewords exceeding the coherence capability of the user equipment; or
a part of full antenna port precoding codewords; or
all full antenna port precoding codewords.

17. The method of claim 13, wherein
information about coherent capability of an antenna port comprises at least one of the following: non coherent capability, partial coherent capability or full coherent capability; and
information about a supported codebook level comprises at least one of the following: a codeword designed for multiple antenna ports with a highest coherent capability as partial coherent capability, or a code word designed for multiple antenna ports with a highest coherent capability as full coherent capability.

18. A non-transitory computer-readable storage medium, storing computer-executable instructions for executing the power control implementation method of claim 1.

* * * * *